(12) United States Patent
Kamm et al.

(10) Patent No.: US 7,742,217 B2
(45) Date of Patent: Jun. 22, 2010

(54) IMAGE GENERATION UNIT AND METHOD TO USE AN IMAGE GENERATION UNIT

(75) Inventors: Markus Kamm, Karlsruhe (DE); Olivier Ripoll, Rueschlikon (CH)

(73) Assignee: Sony Deutschland GmbH, Berlin (DE)

( * ) Notice: Subject to any disclaimer, the term of this patent is extended or adjusted under 35 U.S.C. 154(b) by 199 days.

(21) Appl. No.: 11/917,209

(22) PCT Filed: Jun. 14, 2006

(86) PCT No.: PCT/EP2006/005753
§ 371 (c)(1), (2), (4) Date: Dec. 12, 2007

(87) PCT Pub. No.: WO2006/133937
PCT Pub. Date: Dec. 21, 2006

(65) Prior Publication Data
US 2008/0204847 A1    Aug. 28, 2008

(30) Foreign Application Priority Data
Jun. 14, 2005    (EP)    ................... 05012806

(51) Int. Cl.
*G02F 1/01* (2006.01)
(52) U.S. Cl. .................. 359/279; 359/242; 359/251
(58) Field of Classification Search .................. 359/279
See application file for complete search history.

(56) References Cited

U.S. PATENT DOCUMENTS

| | | | |
|---|---|---|---|
| 6,577,429 B1 * | 6/2003 | Kurtz et al. | 359/279 |
| 7,046,446 B1 * | 5/2006 | Kowarz et al. | 359/618 |
| 2004/0008399 A1 | 1/2004 | Trisnadi | |
| 2006/0221429 A1 * | 10/2006 | Christensen et al. | 359/279 |

FOREIGN PATENT DOCUMENTS

| | | |
|---|---|---|
| DE | 195 08 754 | 9/1996 |
| DE | 197 51 190 | 5/1999 |
| EP | 1 328 128 | 7/2003 |
| WO | 00 62114 | 10/2000 |

OTHER PUBLICATIONS

Trisnadi, J. I. "Speckle Contrast Reduction in Laser Projection Displays"., Proceedings of SPIE, vol. 4657, pp. 131-137, 2002.
"Perceived Speckle Reduction in Projection Display Systems"., IBM Technical Disclosure Bulletin, vol. 40, No. 7, pp. 9-11, 1997.

* cited by examiner

*Primary Examiner*—Jessica T Stultz
(74) *Attorney, Agent, or Firm*—Oblon, Spivak, McClelland, Maier & Neustadt, L.L.P.

(57) ABSTRACT

An image generation unit with an illumination unit for generating a plurality of coherent sub-beams and for illuminating an image modulator, including a light source, and a projection lens for superimposing each of the coherent sub-beams onto a projection screen plane. An optical set-up introduces angles between each two of the sub-beams, which are chosen to produce uncorrelated speckle patterns in the projection screen plane, resulting in an interference speckle pattern. A phase modulator including a liquid crystal cell changes its directory profile in a lateral manner, thereby being able to change the phase of light of each sub-beam individually.

10 Claims, 15 Drawing Sheets $\phi_{h,v}(t) \in [0, 2\pi]$ $MH \times MV = M$
$h = 1, \ldots, MH$
$v = 1, \ldots, MV$

| $\phi_{1,MH}(t)$ | | | | | | | $\phi_{MV,MH}(t)$ |
|---|---|---|---|---|---|---|---|
| | | | | | | | |
| | | | | | | | |
| $\phi_{1,2}(t)$ | ... | | | | | | |
| $\phi_{1,1}(t)$ | $\phi_{2,1}(t)$ | | | | | | $\phi_{MV,1}(t)$ |

Fig. 4

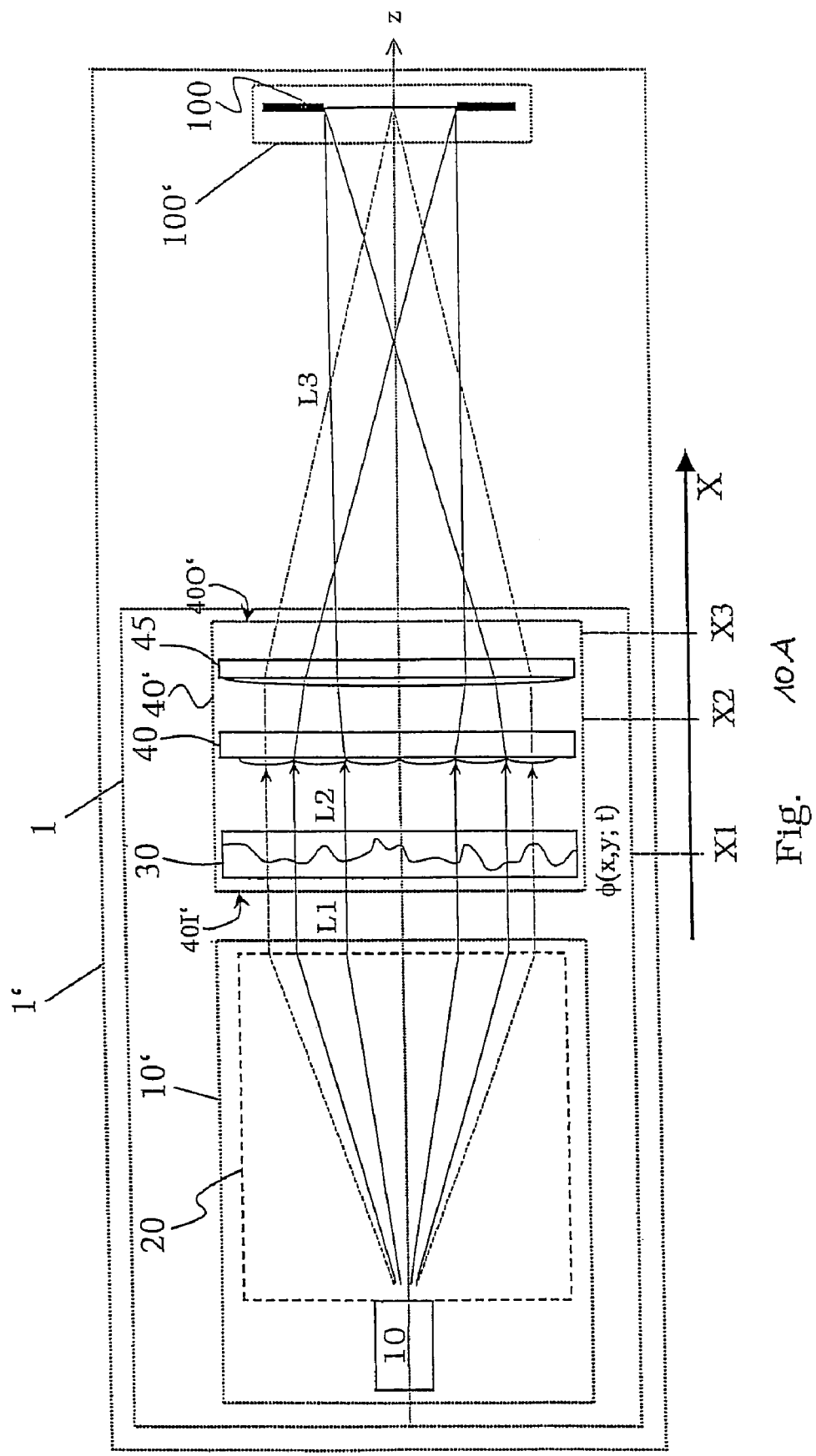

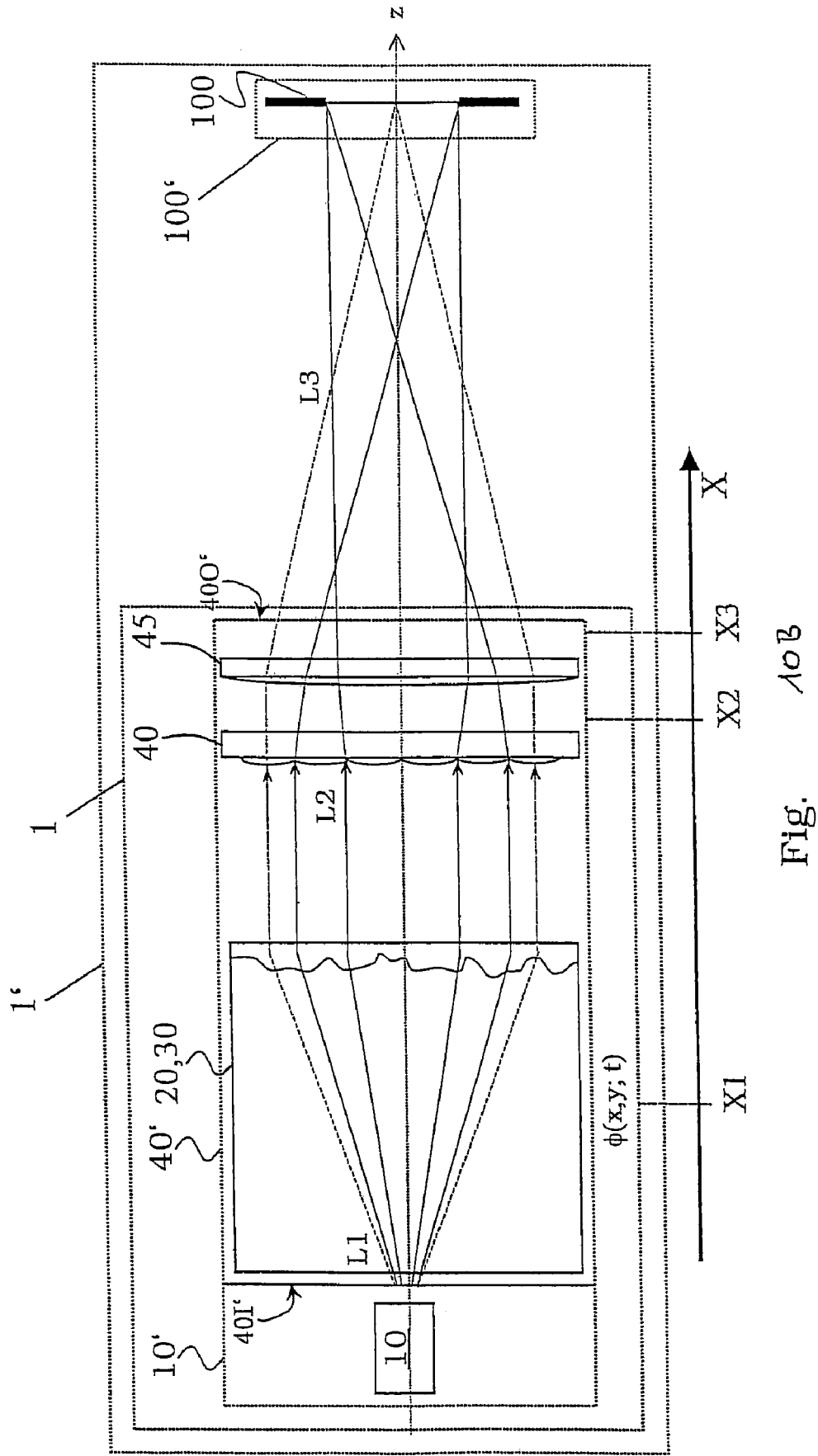

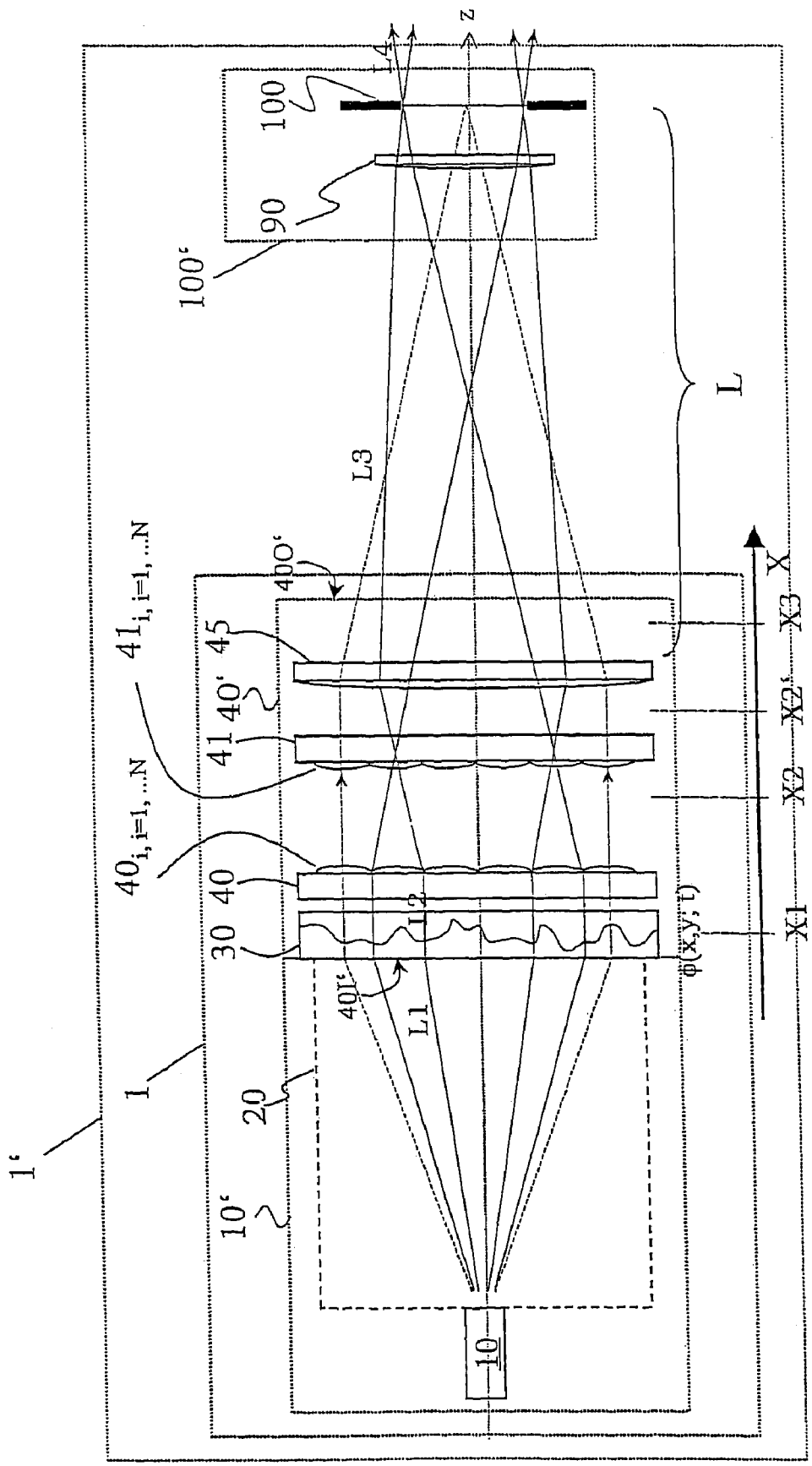

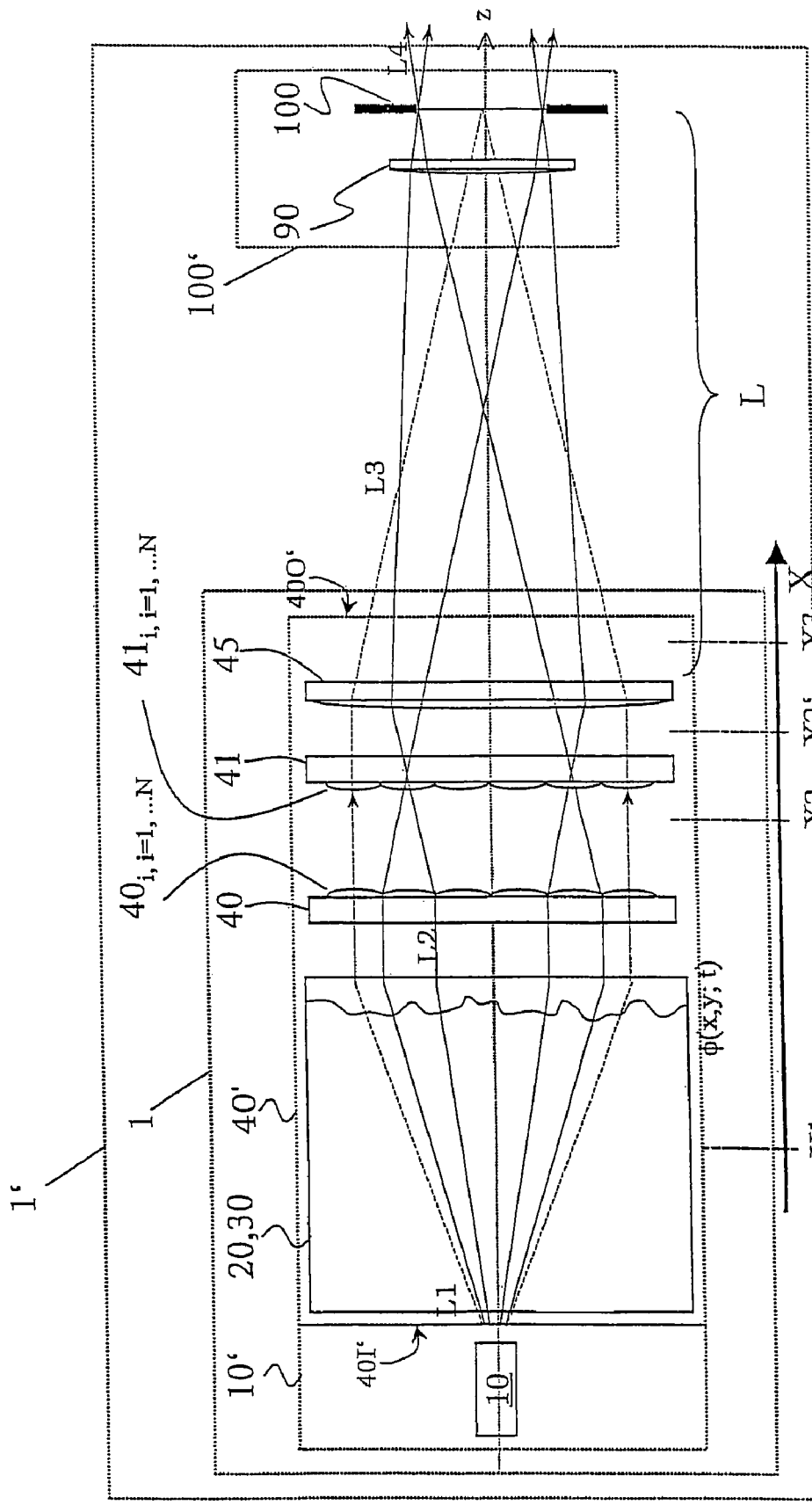

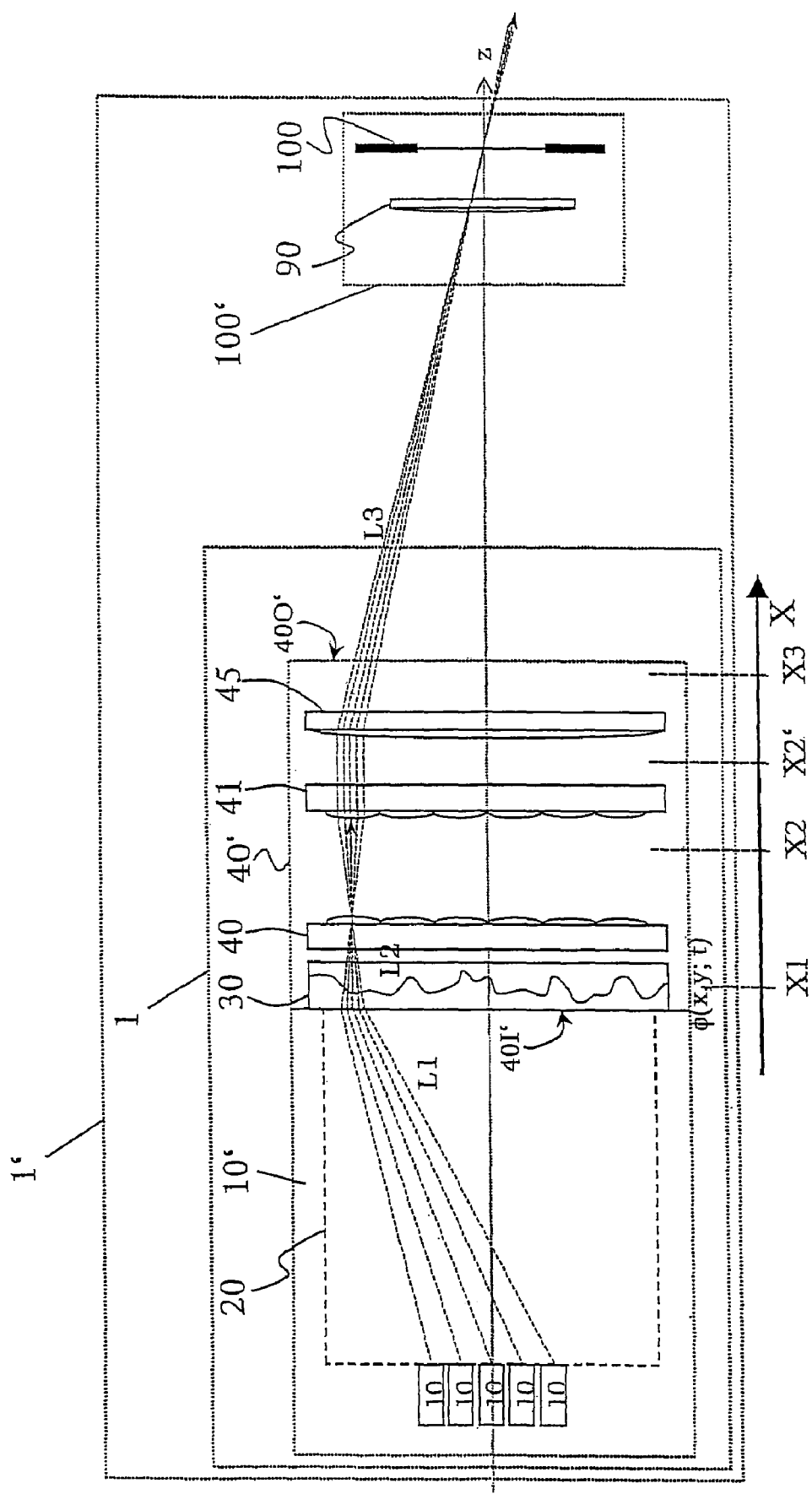

IMAGE GENERATION UNIT AND METHOD TO USE AN IMAGE GENERATION UNIT

FIELD OF THE INVENTION

The present invention relates to an image generation unit and a method to use an image generation unit. The present invention more particularly relates to laser illumination device providing beam shaping and speckle reduction capabilities, and image display engine using the device.

BACKGROUND OF THE INVENTION

Display devices become more and more important in electronic equipment and customer devices. Therefore, the technical development also focuses on processes and devices of illumination, image generation, and projection. It is a well-known problem that illumination devices and respective light sources do not only generate light in the respective channels with respective profiles and distributions but also tend to inherently produce some parasitic noise. These noise are called speckles in the field of laser light sources.

Lens arrays—often in the form fly-eye lenses or integrator plates—are commonly used in projection systems in order to uniformly illuminate an image modulator.

Laser projectors today are commonly realised by using one single laser beam for each colour or colour channel R, G, B which scans line by line over the screen (2D scanning projector). The image is generated on the screen by modulating the beam intensity synchronously with the line frequency. For the horizontal and vertical movement of the beam two scanning mirrors are used. Such kind of laser projectors with a single scanning beam are a potential safety risk for viewers, because in case of a malfunction of the scanning mirrors a static laser beam of high intensity is projected to the screen.

Another approach to use laser light in projectors is realized by the GLV (Grating Light Valve) technology. In such devices the laser beam is expanded to form a vertical line, which is projected to a one-dimensional image modulator (GLV chip). This GLV chip modulates the intensity of the reflected light to generate an vertical image line. The reflected light is projected to the screen and—by use of one horizontal scanning mirror—it is scanned over the screen. A full image is generated by changing the image content of the GLV chip synchronously with the horizontal scanning mirror.

Laser speckle is commonly reduced by the presence of a moving random diffuser or random phase retarder in the optical path, at a point where the laser is focused before the image formation device or at a plane where the image is formed in the optical systems: (see: Trisnadi in Proc SPIE 4657, 2002).

Today's projectors (data- and video-projectors) commonly use arc-lamps as light source. These lamps have several drawbacks: As these lamps emit white light, the light must be split into the primary colours (R, G, B) by the use of filters, which add size, weight and cost to the projection system. Moreover, light, which is not within the spectral range of the primary colours, is lost, thereby reducing the efficiency of the system.

Another drawback is the emission of IR- and UV-radiation. The IR-radiation produces heat and the UV-radiation causes degradation of organic components during aging.

The glass bulb containing the electrodes of the arc lamp has an operating temperature close to 1000° C. and consequently has to be controlled and cooled by a forced airflow, which causes annoying noise.

Light emitted by high-pressure arc lamps is unpolarized, which is a drawback when used in combination with polarizing image modulators like LCD (Liquid Crystal Display) or LCoS (Liquid Crystal on Silicon).

An important quantity in the design of projectors is the étendue (optical extent). In a simplified description the étendue is defined by the product of the cross-sectional area of a light beam with the beam divergence angle of that beam at a certain position. If a light beam is modified by an optical element, the étendue is preserved if the optical element was well corrected or the étendue is increased if the optical element was not well corrected. It is impossible to decrease the étendue of a beam by any kind of optical transformation, except the case where part of the beam is simply cut and light is lost. In other words, the image luminance can never exceed the source luminance. This has consequences for the design of projectors, as the optical elements in a projector have a limited size (this limits the beam cross section) and/or a limited acceptance angle (this limits the beam divergence angle). For example the projection lens has a certain f/# which limits the beam divergence angle. Moreover, the image modulators are limited by size (cost) and beam divergence angle: The bigger the beam divergence angle of a light beam the lower is the contrast of the modulated image. As a result, the étendue of the light source must be smaller than the étendue of the most limiting optical element in a projector. The étendue of a light source should be as small as possible in order to achieve compact projectors with good image quality (contrast, brightness).

An ideal projection lamp with zero étendue would be on one hand a point source (zero cross section, but high beam divergence) or on the other hand a collimated beam without divergence (any cross section but zero beam divergence). In reality the étendue of arc lamps is determined by the size of the arc. The minimal possible arc length is restricted due to the thermal stress of the electrodes, which strongly influences the lifetime of the lamp. As a compromise, commonly used arc lamps today have arc lengths slightly below 1 mm and lifetimes between 2000 and 6000 hours (dependent on power).

LEDs or light emitting diodes as light source in a projector can overcome many of the above-mentioned drawbacks of arc lamps.

LEDs
- emit inherently light in the wavelength range of primary colours (R, G or B).
- do not emit UV- or IR radiation.
- can be cooled passively or at least with a low air flow without generating fan noise.
- have potentially a long lifetime.
- can be driven in a pulsed mode for sequential color generation.

But there a still some drawbacks.
- LEDs emit unpolarized light, which is a drawback if used in combination with polarizing image modulators (LCD, LCoS).
- LEDs have a significant étendue (emitting light with a high divergence angle, usually like a Lambertian emitter).

Laser light sources are very close to an ideal projection light source, as they can solve all of the above mentioned drawbacks of arc lamps and LED.

Laser Light Sources
- emit inherently monochromatic light (R, G or B).
- do not emit UV- or IR radiation.
- can be cooled passively or at least with a slow air flow without generating fan noise.

have potentially a long lifetime.

can be driven in a pulsed mode for sequential color generation.

emit inherently polarized light have extremely low étendue (close to zero).

Laser projectors today are commonly realised by using one single laser beam for each color (R, G, B) which scans line by line over the screen (2D scanning projector). The image is generated on the screen by modulating the beam intensity synchronously with the line frequency. For the horizontal and vertical movement of the beam two scanning mirrors are used. Such kind of laser projectors with a single scanning beam are a potential safety risk for viewers, because in case of a malfunction of the scanning mirrors a static laser beam of high intensity is projected to the screen.

Another approach to use laser light in projectors is realized by the GLV (Grating Light Valve) technology. In such devices the laser beam is expanded to form a vertical line which is projected to a 1-dimensional image modulator (GLV chip). This GLV chip modulates the intensity of the reflected light to generate an vertical image line. The reflected light is projected to the screen and—by use of one horizontal scanning mirror—it is scanned over the screen. A full image is generated by changing the image content of the GLV chip synchronously with the horizontal scanning mirror.

A third method to use lasers in projectors is to illuminate image modulating panels like LCD (Liquid Crystal Display) or LCoS (Liquid Crystal on Silicon) or MEMS (Micro-electromechanical Systems). In this case the image is completely generated by the image modulating panel and the laser light just illuminates the (rectangular) aperture of the panel. This is very similar to any standard projector which uses arc lamps for illumination. Several groups have proposed such kind of laser projectors but today no such product is on the market. DOEs (Diffractive Optical Elements) or refractive optical elements like microlens arrays are used for beam shaping to illuminate the rectangular aperture of the panel.

But due to the coherence and low étendue of laser beams another phenomenon is observed when projecting laser light to a screen: Laser light is scattered on the diffusing screen and a parasitic noise called speckle is observed. Laser speckle is commonly reduced by the presence of a moving random diffuser in the optical path, at a point where the laser is focused before the image formation device or at a plane where the image is formed in the optical systems. (see Trisnadi in Proc SPIE 4657, 2002). Another proposed method to reduce speckles is the use of acousto-optic diffuser plates (G. Bastian, GMM Workshop Mikrooptik in Karlsruhe, 3/4 Feb. 2005).

The quantity to describe speckle is the speckle contrast c, which is defined by $c=\sigma/I$. (see J. W. Goodman in J. Opt. Soc. Am, Vol. 66, No. 11, November 1976). Here $\sigma$ is the standard deviation of the intensity distribution of the pattern and I is the mean intensity of the pattern. In the worst case c equals 1, which means maximum noise of the image. In the best case c equals 0, which means a perfectly smooth ($\sigma=0$) image.

The general idea to reduce speckle with moving or time-varying diffusers is to generate as many as possible different speckle patterns within the integration time of the detector (human eye). The superposition of N uncorrelated speckle patterns within the integration time gives a smoother image with a speckle contrast reduced by factor $\sqrt{N}$ (see J. W. Goodman in J. Opt. Soc. Am. Vol. 66, No. 11, November 1976). Example: 625 uncorrelated speckle pattern during one image frame (assuming 50 Hz) are required in order to reduce the speckle contrast by a factor $25=\sqrt{625}$. This means 625 different and uncorrelated patterns must be generated within 20 ms.

i) Now assuming a 2D scanning laser projector with 50 Hz image frame rate and HDTV resolution (1920×1080 Pixel), the laser beam needs 9.6 ns to scan over one pixel. As this occurs only once during the frame period of 20 ms, the 625 different pattern must be generated within 9.6 ns when the beam is passing the pixel. This translates to a pattern frequency of 64.8 GHz.

ii) In the case of a 1D scanning laser (GLV), the laser beam needs approx. 10 μs to scan over one pixel-line. With 625 different pattern during this period this translates to a pattern frequency of 60 MHz.

iii) When illuminating an image modulator (LCD, LCoS, MEMS), then the laser light is continuously illuminating each pixel (except in the case where the laser is pulsed). In that case 625 different patterns must be generated during the period of 20 ms which translates into a pattern frequency of 31.25 kHz.

The conclusion from i) to iii) is, that speckle reduction by moving or changing diffusers is easiest in case iii).

Another method to reduce the speckle contrast is to use several laser light sources in parallel, e.g. laser array, where the lasers are incoherent to each other. If using N uncorrelated lasers then the speckle contrast again is reduced by factor $\sqrt{N}$ (see: J. W. Goodman in J. Opt. Soc. Am, Vol. 66, No. 11, November 1976).

In EP 1328128 a laser projection display system is disclosed, which includes a laser light source for emitting a light beam having a coherence length; a beam expander for expanding the light beam; a spatial light modulator; beam shaping optics for shaping the expanded laser beam to provide uniform illumination of the spatial light modulator, the beam shaping optics including a fly's eye integrator having an array of lenslets; a diffuser located in the light beam between the laser light source and the beam shaping optics; an electrically controllable de-speckling modulator for modifying the temporal and spatial phase of the light beam; and a projection lens for producing an image of the spatial light modulator on a distant screen. The electrically controllable de-speckling modulator comprises a bulk electro-optic substrate with a series of individual modulator sites that receive control signals to provide localized random phase changes to the incident light. By independently electrically addressing the modulator sites, each site in the electrically controllable de-speckling modulator can introduce phase delays in the light beam with respect to the neighbouring sites. A different voltage or voltage duration is applied to each site, thus producing a phase delay corresponding to as much as several waves of propagation in the light. Each modulator site has a delay region through which a beam of light encounters a time or phase delay in relation to the electric field applied between a top electrode and a bottom electrode, when a beam of light enters bulk electro-optic substrate through an input facet, after which it traverses the modulator, and exits through an output facet. The use of bottom and top electrodes on the bulk electro-optic crystal results in a rather elaborated and difficult production scheme in order to obtain a de-speckling modulator in two dimensions.

SUMMARY OF THE INVENTION

It is an object of the present invention to provide an image generation unit and a method to use an image generating unit, which introduce at most a comparable reduced parasitic variational noise into the produced or used radiation or light, with a simpler production feasibility and better compactness.

The object is achieved by an image generation unit according to claim 1 and by a method to use an image generation unit according to claim 10. Preferred embodiments are within the scope of the respective dependent subclaims.

An expanded laser beam is divided into sub-beams. The sub-beams are superimposed in the image plane with a certain separation angle between each of the sub-beams which must be large enough to generate uncorrelated speckle patterns. The interference speckle pattern on the image plane will still have the same speckle contrast. To reduce the speckle contrast the phases of the light wave of each sub-beam are individually changed with time in such a way that as many as possible uncorrelated speckle patterns are generated on the image plane during the integration time of a detector (e.g. the human eye). M uncorrelated speckle pattern during the integration time T will reduce the speckle contrast by factor $\sqrt{M}$. The phase of light is modulated individually for each sub-beam by means of a liquid crystal (LC) phase modulator, which electrodes are easily coated to produce a two-dimensional phase modulator, since they are situated on the surfaces of the liquid crystal cell, mainly perpendicular to the direction of the sub-beams. The liquid crystal (LC) in the phase modulator forms a director profile which can be modified by an electrical field. As a result the refractive indices—and therefore the phase retardation as well—can be changed in lateral (by separate electrodes) and temporal (by changing the electrical field with time) manner.

In a preferred embodiment according to claim 2 the angle is chosen at least half of the aperture angle $\Theta$ of the detector (e.g. human eye) in order to achieve a sufficiently uncorrelated (correlation factor <0.2) speckle pattern.

In a preferred embodiment of claim 3 the liquid crystal cell contains a nematic liquid crystal, which is easy to handle.

In a further preferred embodiment according to claim 4 the liquid crystal cell contains a polymer dispersed liquid crystal, which has a faster switching time than a nematic liquid crystal.

A good uniformity of light in the image plane is obtained according to claim 5 by using a first and a second integrator plate, which each are built of a plurality of lens segments having a rectangular shape, whereby each such lens segment of the first integrator plate is imaged by a correspondent lens segment of the second integrator plate and a condenser lens onto the image plane.

Different preferred embodiments of beam expanders are described according to claims 6, 7 and 8.

In a further preferred embodiment according to claim 9 light, which is spatially modulated by an image modulator to generate the image is projected by a projection lens to an image plane. The phase modulator is placed in close vicinity of the aperture stop of the projection lens. At this position the phase of light of each sub-beam is individually modulated by means of the phase modulator and is superimposed to the image plane.

BRIEF DESCRIPTION OF THE DRAWINGS

The invention will now be explained based on preferred embodiments thereof and by taking reference to the accompanying and schematical figures.

FIG. 4 is a cross-sectional front view elucidating some properties of a further embodiment of the phase modulator according to the present invention.

FIGS. 10A, 10B are schematic and cross-sectional side views for illustrating image generating units according to another embodiments of the present invention.

FIGS. 11A, 11B are schematic and cross-sectional side views for illustrating image generating units according to another embodiments of the present invention.

FIG. 12 is a schematic and cross-sectional side view for illustrating an image generating unit according to a another embodiment of the present invention.

DETAILED DESCRIPTION OF THE INVENTION

In the following functional and structural description similar or equivalent element structures will be denoted with the same reference symbols. Not in each case of their occurrence a detailed description will be repeated.

Figure 1:
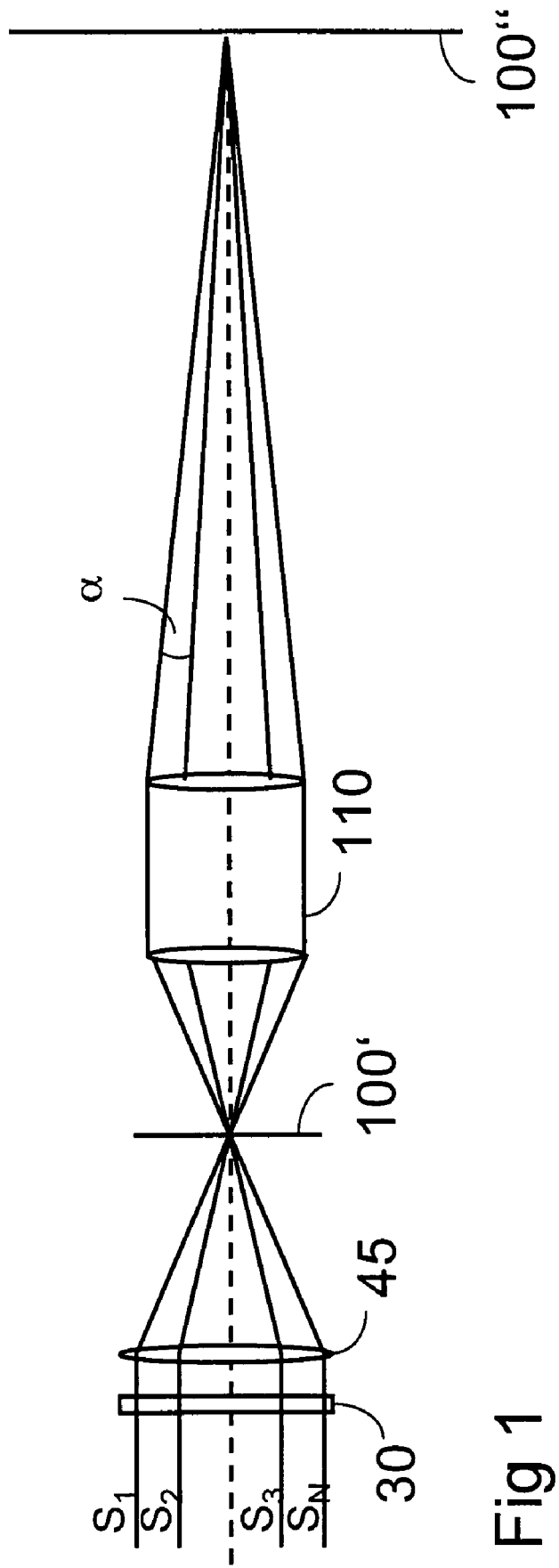
FIG. 1 is a schematic and cross-sectional view of an embodiment of the present invention.

In FIG. 1 it is depicted schematically how a plurality of coherent sub-beams $S_1, \ldots, S_N$ are superimposed with the help of an optical imaging apparatus (here a condenser lens 45) to an image modulator 100'. The image at the image modulator 100' is projected by the projection lens 110 to the projection screen 100". The angles $\alpha$ of the projected beams of the sub-beam $S_1, \ldots, S_N$ are sufficiently separated, so that each of the sub-beams $S_1, \ldots, S_N$ will generate a different speckle pattern on the projection screen 100" which is uncorrelated to the speckle patterns generated from the other sub-beams. The speckle pattern depends on wavelength, size and density of diffusing particles in the projection screen, thickness of the diffusing layer in the projection screen and position and aperture of the detector (e.g. human eye). Experimental investigations revealed that the minimum separation angle $\Delta\alpha$ is about half of the aperture angle $\Theta$ of the detector (e.g. human eye) in order to achieve a sufficiently uncorrelated (correlation factor <0.2) speckle pattern. However the speckle contrast of the superimposed pattern is still not reduced, since the patterns add on complex amplitude basis. Even if the phases of all sub-beams $S_1, \ldots, S_N$ are modulated by a common phase delay, the speckle pattern will remain unchanged. To reduce the speckle contrast of the superimposed image plane 100", the phases of light of each sub-beam $S_1, \ldots, S_N$ are individually changed with time with the help of the phase modulator 30 in such a way that as many as possible uncorrelated speckle patterns are generated during the integration time of the detector (e.g. the human eye). M uncorrelated speckle pattern during the integration time T will reduce the speckle contrast by factor $\sqrt{M}$.

Figure 2:
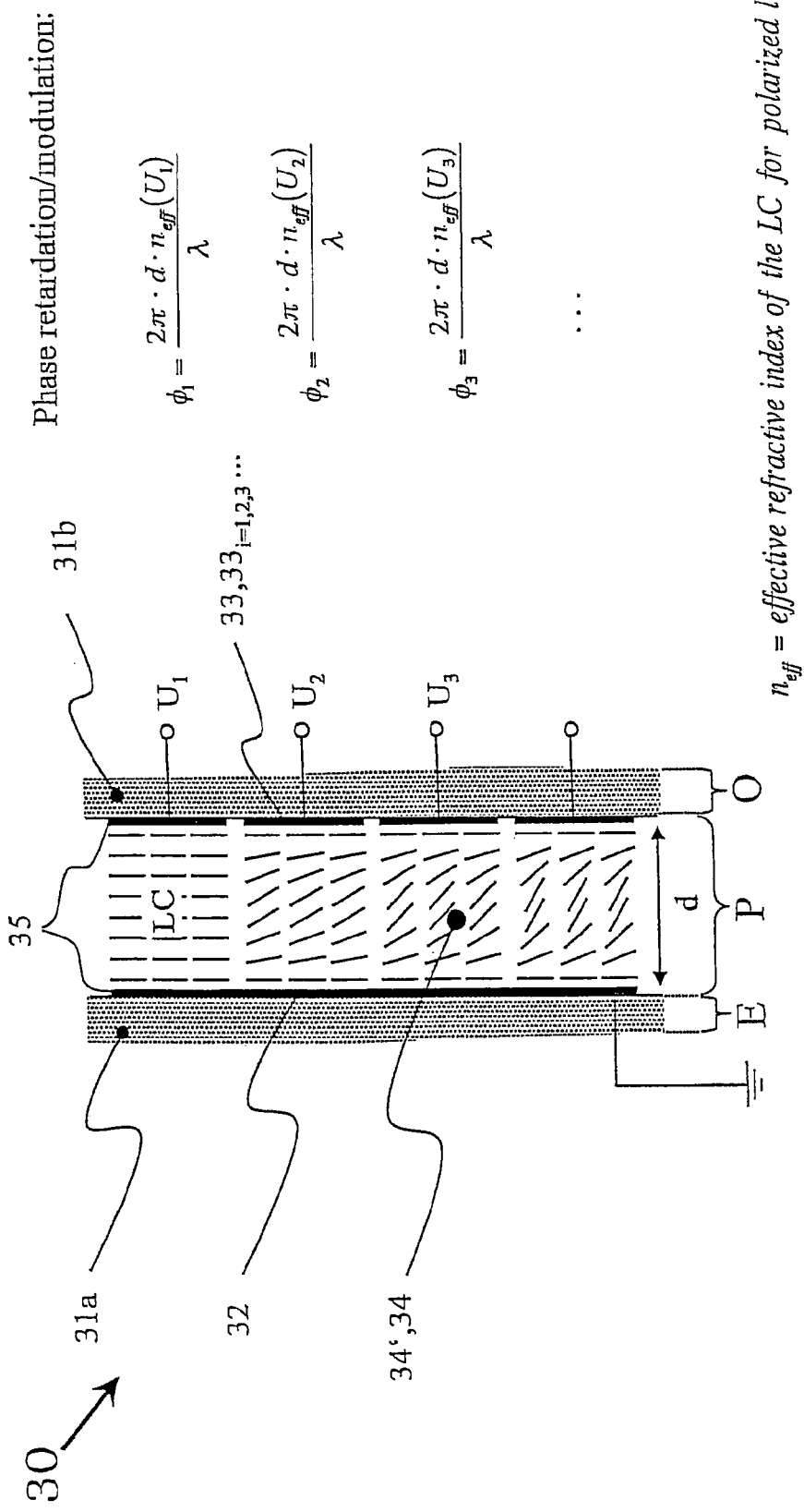
FIG. 2 is a schematic and cross-sectional side view of the liquid crystal cell, which contains a nematic liquid crystal.

FIG. 2 is a schematic and cross-sectional side view of a preferred embodiment of the light pre-processing optical element 30 or phase modulator 30 according to the present invention. Key aspect of this embodiment for the light pre-processing optical element 30 or phase modulator 30 is the provision of a liquid crystal element 34' in the form of a liquid crystal layer 34 which is sandwiched between an electrode arrangement 35 of a pair of first and second control electrodes 32 and 33. The entity formed by the liquid crystal element 34' and the electrode arrangement 35 forms the pre-processing section P of the embodiment of the light pre-processing optical element 30 or phase modulator 30.

In the embodiment of FIG. 2 the light entrance section E is formed by a first substrate 31a or substrate plate 31a and the light output section O is formed by a second substrate 31b or substrate plate 31b. In the embodiment shown in FIG. 2, the first control electrode 32 in direct vicinity to the first substrate plate 31a is formed by a single control electrode 32 set to ground potential. On the other hand the second control electrode 33 of the electrode arrangement 35 is in close vicinity to the second substrate plate 31b and formed by a plurality, array or matrix of independently controllable electrode segments 33j with j=1, . . . , M. According to the embodiments of FIG. 2 the portion of the liquid crystal element 34' directly sandwiched between the first and common control electrode 32 and a respective electrode segment 33j of the second control electrode 33 can be set to a distinct value of a wave front or phase modulation by using the dependency of the effective refraction index $n_{eff}$ on an externally applied electrical field or electrical voltage according to $$\varphi_j = \frac{2\pi \cdot d \cdot n_{eff}(U_j)}{\lambda}.$$

Therefore according to the arrangement of the segments 33j of the second control electrode 33 one achieves a spatially dependent distribution of the phase modulation if the voltages of the electrode segments 33j are controlled in a respective and independent manner, for instance randomly.

FIG. 2 shows a cross section of this liquid crystal cell. The phase modulator 30 comprises a liquid crystal cell. The liquid crystal fills the gap between two substrate plates 31a, 31b. An electrical field is applied between the common electrode 32 on the substrate 31a and the pattern of multiple electrodes 33i, i=1, . . . M on the counter substrate 31b. All electrodes are transparent in order to transmit light. The direction of the so-called director of the liquid crystal layer is aligned by alignment layers. It is not part of the present invention to describe the details of the alignment of liquid crystal layers and the realization of the electrical connections of the electrodes. This is well known by prior art (e.g. the technology of liquid crystal displays). Essential for the use in the present invention is the fact that a liquid crystal layer 34 has an effective (average) refractive index neff which is dependent from the applied voltage Ui=1, . . . M across the layer. This effective (average) refractive index neff depends on the polarization direction of light, as a liquid crystal layer is birefringent. It is preferred that the liquid crystal layer 34 is aligned parallel between the substrates 31a and 31b. In that case the polarization direction of linear polarized is not changed, if the polarization direction is parallel or perpendicular to the alignment direction of the liquid crystal layer 34. The phase of linear polarized light which passes the liquid crystal layer 34 is retarded by $\phi i=2\pi \times d \times neff(Ui)/\lambda$, where d is the thickness of the liquid crystal layer 34 and $\lambda$ is the wavelength of light. By applying different voltages to each individual electrode the phase front is laterally disturbed. By changing the voltages with time Ui(t) the phase front is disturbed in time. Consequently different uncorrelated phase front patterns can be generated during a given period of time. For example, if M different phase front patterns are generated during the period of one image frame, e.g. 20 ms, then the speckle contrast of a projected image is reduced by factor $\sqrt{M}$.

A liquid crystal cell or LC cell is used in order to modulate the wave-front of the beam in order to reduce or destroy the coherence of the light, thereby suppressing the appearance of speckles in an generated and projected image.

The liquid crystal cell or LC cell may comprise an electrode pattern on one or both sides, wherein each electrode can be driven independently by a continuous or modulated voltage signal in order to change the director pattern of the liquid crystal layer, thereby changing the phase retardation in a spatial and/or temporal manner in order to reduce the speckle contrast of the resulting beam when projected on a screen.

The liquid crystal layer of said liquid crystal cell may be parallely aligned thereby having an uniaxial director profile with refractive index ne along the extraordinary axis and refractive index no within the plane perpendicular to the extraordinary axis.

The light beam may be linearly polarized and wherein the extraordinary axis is aligned parallel or perpendicular to the electrical field vector of the linear polarized beam in order to keep the polarization state unchanged when passing the liquid crystal layer.

The shape and position of the electrodes of said liquid crystal cell may be congruent to the shape and position of the lens segments of said first lens array in order to control the phase retardation of the sub-beams emerging from each lens segment individually and independently from each other.

The electrodes of said liquid crystal cell may be replaced by several sub-electrodes, wherein each of them can be independently driven by a continuous or modulated voltage in order to further reduce the speckle contrast of the system.

Figure 3:
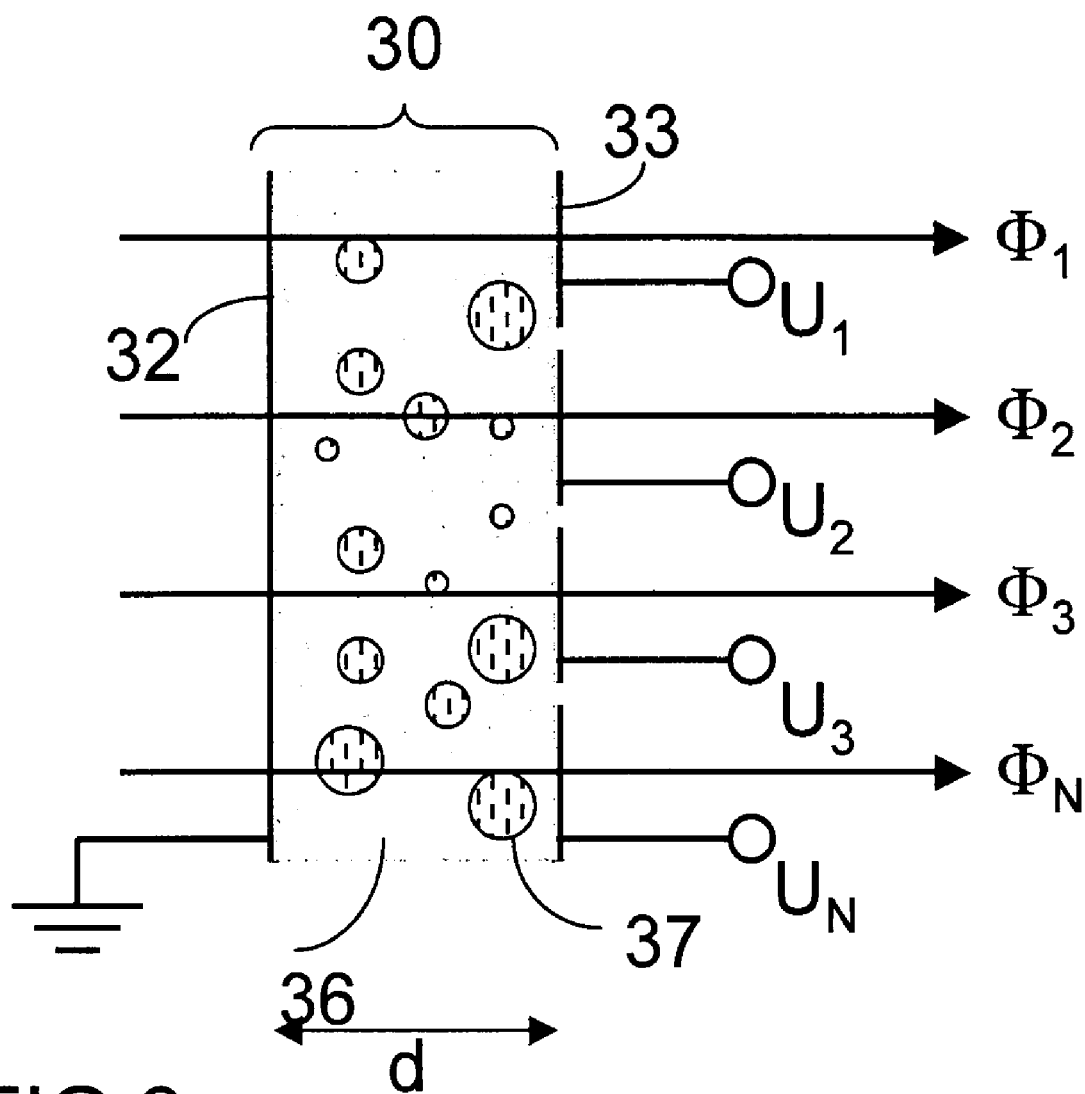
FIG. 3 is a schematic and cross-sectional side view of another embodiment of a liquid crystal cell, which contains a polymer dispersed liquid crystal.

FIG. 3 shows another embodiment of a liquid crystal (LC) cell as a phase modulator 30, which contains a polymer dispersed liquid crystal (36), which has a faster switching time than the configuration of FIG. 2. The sketch of FIG. 3 is only schematic, since the distance d between the two boundary surfaces is several 10 µm, whereas the diameter of the liquid crystal droplets 37 is about less than 100 nm. However, the functionality with electrodes 32, 33 is as described in FIG. 2. The phases are modulated by applying voltages to the electrode segments 33 of the phase modulator 30.

Figure 9:
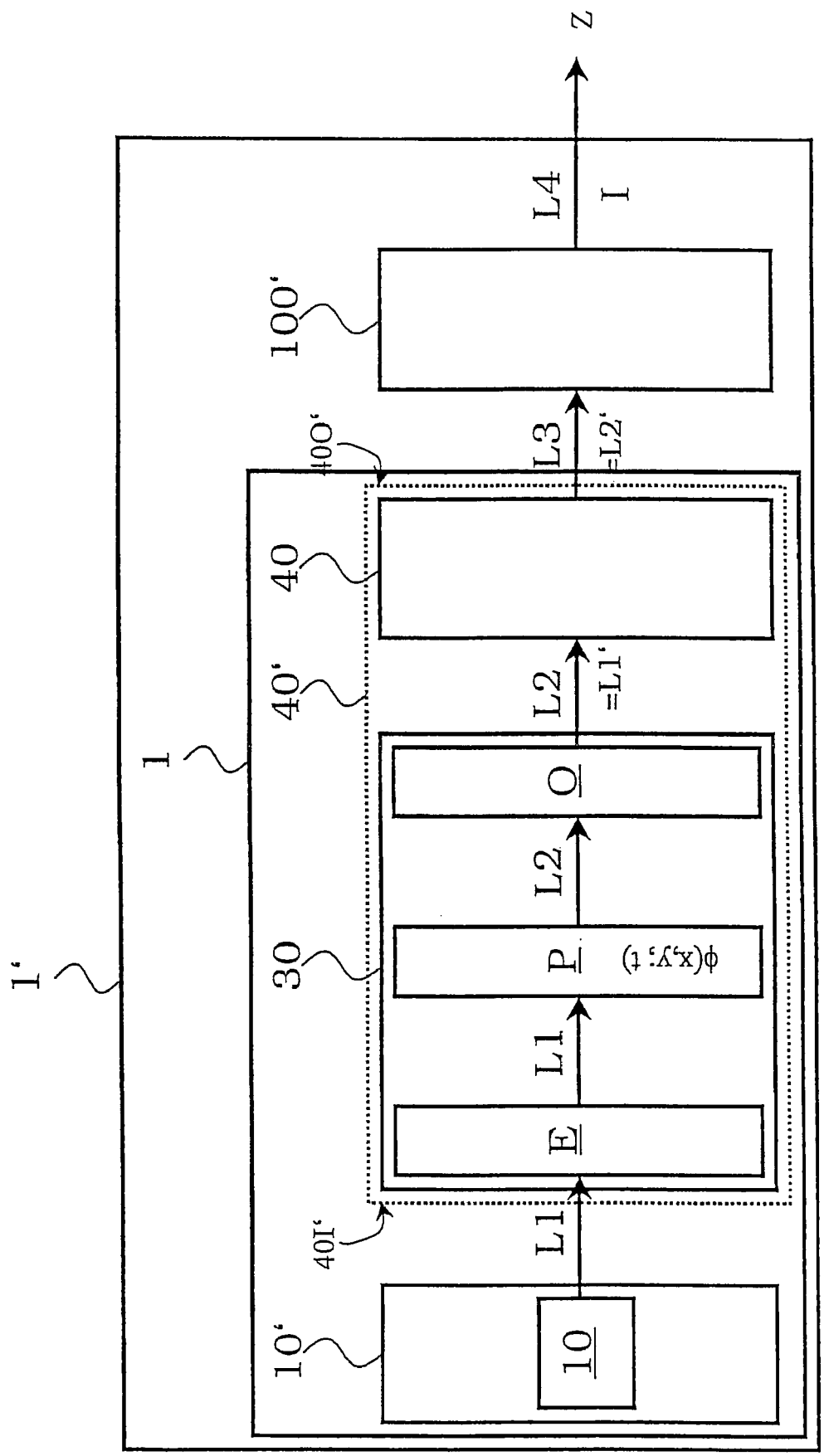
FIG. 9 is a schematical block diagram elucidating the basic principle underlying the present invention.

FIG. 4 shows a cross-sectional front view of an embodiment for the light pre-processing optical element 30 or phase modulator 30 according to the present invention. Here one has by means of the electrode segments 33j of the second control electrode 33 a sub-division of the liquid crystal element 34' and of the liquid crystal layer 34 with respect to the optical phase modulation. In the case of FIG. 9 it has a sub-division of the liquid crystal element 34' in matrix-form with MH columns and MV lines with a condition M=MH·MV. Each segment $34_{h,v}$ of the liquid crystal element 34' or the liquid crystal layer 34 is controlled by a respective electrode segment $33_{h,v}$ to achieve a respective phase modulation $\phi_{h,v}(t)$ in a time-dependent manner with h=1, . . . , MH and with v=1, . . . , MV.

It is preferred, but not necessarily restricted to, that the number and shape of the electrodes 33i, i=1, . . . , M is congruent to the number and shape of the lens segments on lens array 40 as shown in FIG. 4. But it is also possible to increase the number of electrodes (M>N) in order to further disturb the phase front or—on the other hand—to reduce the number of electrodes (M<N) in order to simplify the realization of the electrodes and their electrical connection.

Figure 5:
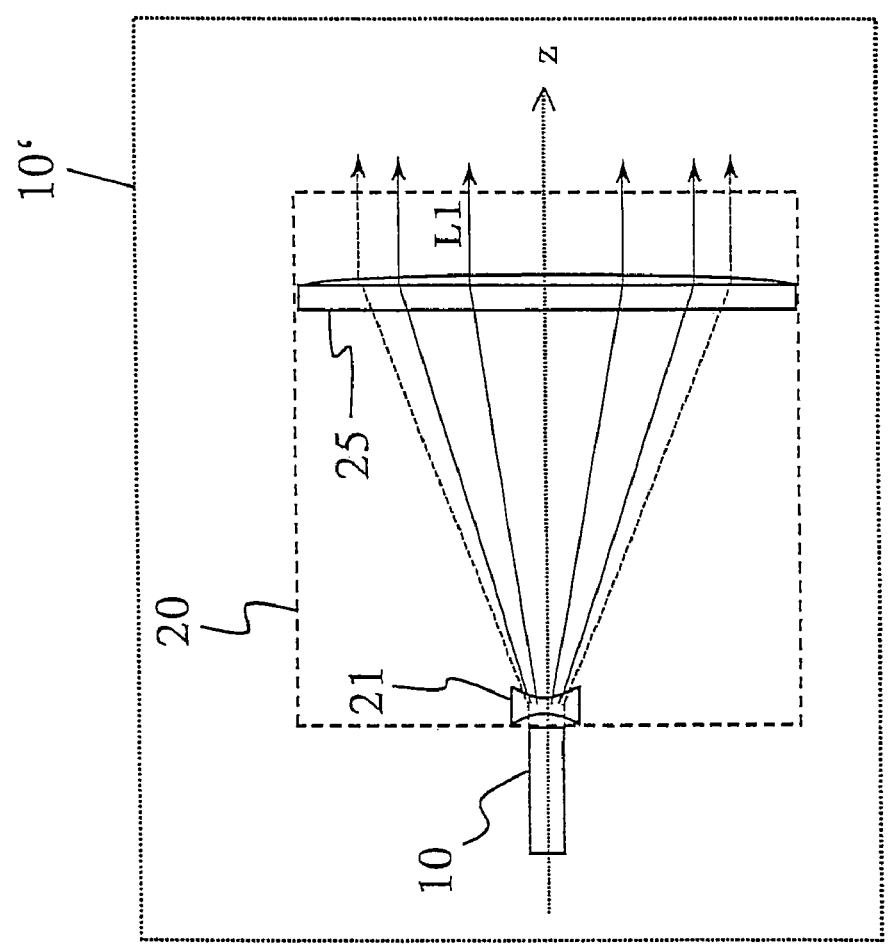
FIG. 5 is a schematical and cross-sectional side view for elucidating an embodiment of an illumination unit which can be applied in the present invention.
Figure 6:
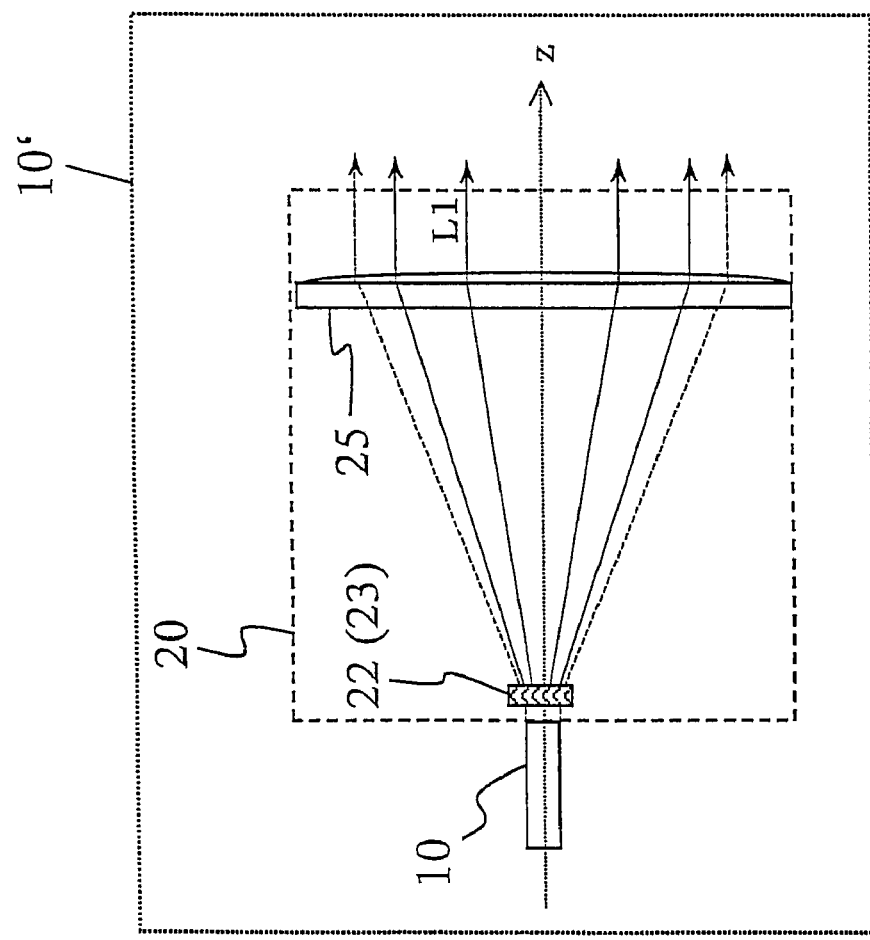
FIG. 6 is a cross-sectional side view of another embodiment for an illumination unit, which can be applied, in the present invention.
Figure 7:
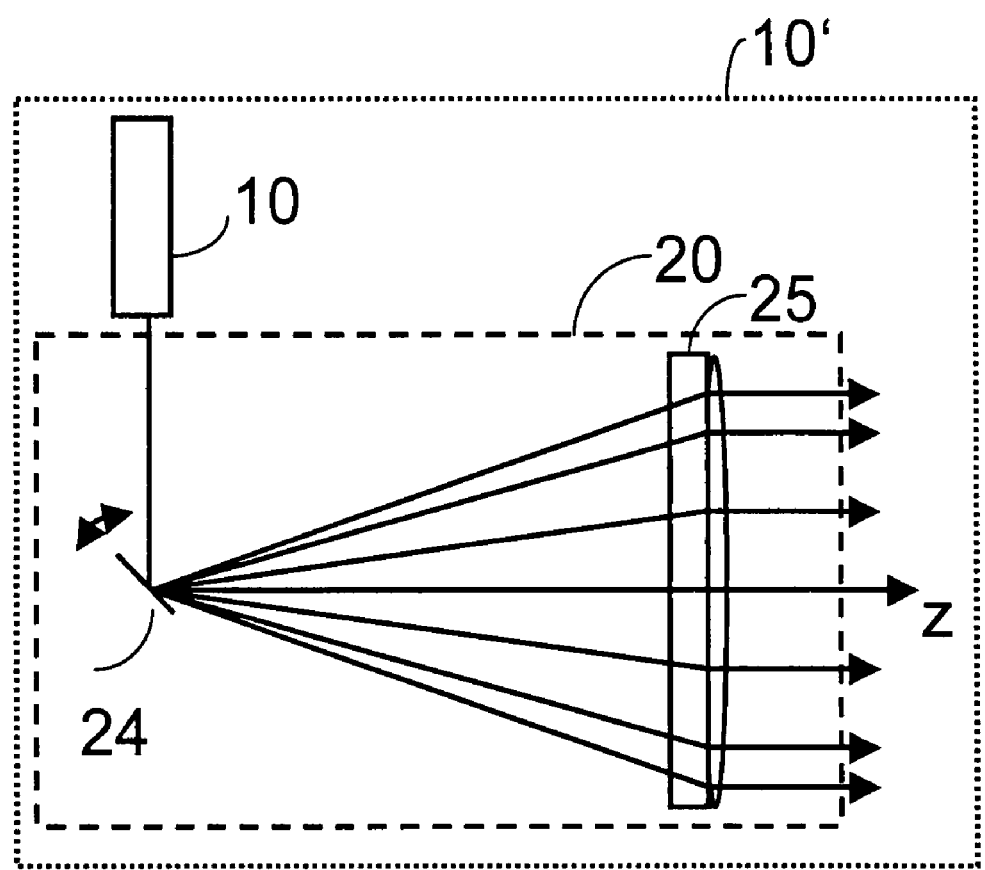
FIG. 7 is a cross-sectional side view of another embodiment for an illumination unit, which can be applied in the present invention.

FIGS. 5, 6 and 7 show embodiments for light source units 10' having different realizations for the expander optics 20'.

The beam expander 20 can be realized according to FIG. 5. A negative lens 21 expands the collimated laser beam to a certain angle and a positive lens 25 at a certain distance collimates the beam again.

Alternatively, according to FIG. 6, a diffuser 22 can be used in order to diffuse the collimated light into a certain cone angle. A second alternative is to use a diffractive optical element 23 (DOE) to expand the laser light beam. In case of a DOE an additional beam shaping is possible in order to adapt the shape of the expanded beam to the shape of the lens arrays. Also a combination of a negative lens and a diffuser or DOE can be used to expand the collimated laser light beam.

In FIG. 7 it is depicted that the beam expander 20 can be realized with a moving mirror 24 and a convex lens 25.

Figure 8A:
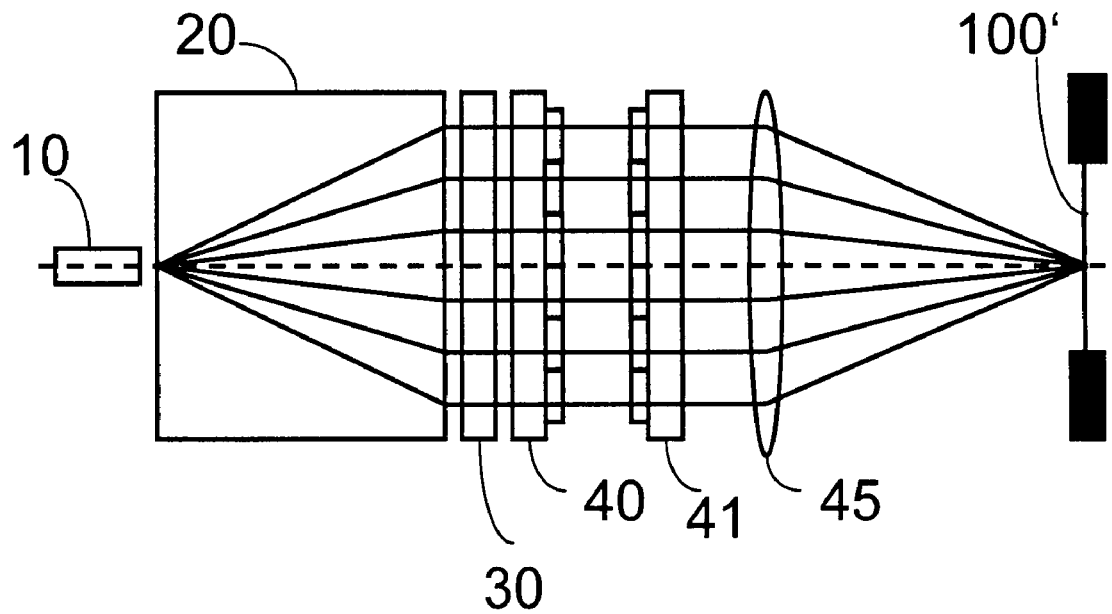
FIG. 8*a* is a cross-sectional side view of another embodiment for an illumination unit, which can be applied in the present invention.

One embodiment of the present invention is depicted in FIG. 8a. A light source 10 (a laser source or an array of laser beams), delivers a laser beam (or an array of laser beams) and is expanded by a beam expander 20. The expanded beam is divided by integrator plates (often called fly-eye lens) 40,41 into a set of sub-beams $S_1, \ldots, S_N$. The lens segments on the first integrator plate 40 have a rectangular shape of the same aspect ratio like the image panel. Each such rectangular segment is imaged by a corresponding segment on the second integrator plate 41 and a condenser lens 45 onto the image panel 100'. As a result the image panel 100' is illuminated by a rectangular shaped beam of light with homogenous light distribution. Said liquid crystal phase modulator 30 can be placed before (as depicted in FIG. 8a), between or behind the integrator plates, changing the phase of light of each sub-beam individually according to the applied voltages. The display panel 100', which can be a transmissive LCD, or a reflective LCD (LCoS, Liquid Crystal on Silicon), or a reflective matrix of tilting micro-mirrors, is generating the image, which is projected by a projection lens to a screen.

Figure 8B:
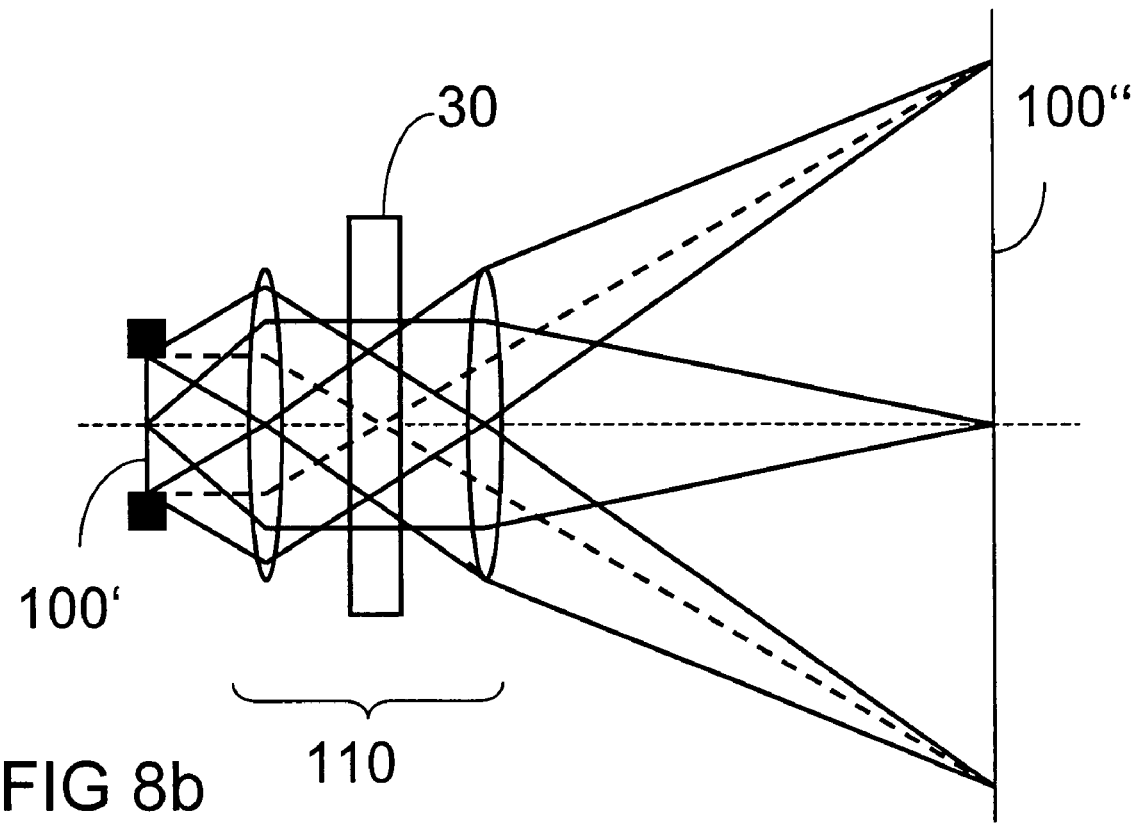
FIG. 8*b* is a cross-sectional side view of a further embodiment for an illumination unit, which can be applied in the present invention.

FIG. 8b shows another embodiment of the present invention. Light, which is spatially modulated by the image panel 100' to generate the image, is projected by a projection lens 110 to the image plane 100". The phase modulator 30 is placed in close vicinity to the aperture stop of the projection lens 110. At this position the phase of light of each sub-beam is individually modulated by means of the LC phase modulator 30 and is superimposed to the image plane 100".

For a better understanding of the invention the following technical background is disclosed as well:

Illumination optics 40' are provided in particular for an image generation unit 1' which comprise a light input portion 40I' for receiving a beam of primary illumination light L1, which are adapted and which comprise means 30, P for independently and/or uncorrelatedly modulating wave fronts, phases or phase relationships of a plurality of parts or sub-beams of said beam of said received primary illumination light L1 to thereby generate respective parts or sub-beams of pre-processed primary illumination light L1' as respective parts or sub-beams of secondary illumination light L2 having independently and/or uncorrelatedly modulated wave fronts, phases and/or phase relationships with respect to each other, which are adapted and which comprise means for superimposing and/or recombining respective parts or sub-beams of said secondary illumination light L2 having independently and/or uncorrelatedly modulated wave fronts, phases and/or phase relationships with respect to each other in order to thereby generate a beam of tertiary light L3 having reduced speckle noise properties when compared to said primary illumination light L1, and which comprise a light output portion 40O' for providing said tertiary illumination light L3 as output light.

Said illumination optics 40' may be adapted and may comprise means 40, 41, 30, P for dividing said received a beam of primary illumination light L1 into said plurality of parts or sub-beams of said beam of said received primary illumination light L1.

In said illumination optics 40' said means 30, P for independently and/or uncorrelatedly modulating wave fronts, phases or phase relationships may be adapted for dividing said received a beam of primary illumination light L1 into said plurality of parts or sub-beams of said beam of said received primary illumination light L1.

Said means 30, P for independently and/or uncorrelatedly modulating wave fronts, phases or phase relationships may be provided as a light pre-processing optical element 30 or phase modulator 30 and in particular as a phase modulator 30.

Said light pre-processing optical element 30 or said phase modulator may comprise a light entrance section E for receiving primary illumination light L1, a light pre-processing section P for pre-processing said received primary illumination light L1 in order to generate pre-processed primary illumination light L1' as secondary illumination light L2, and a light output section O for providing said secondary illumination light L2, wherein said light pre-processing section P is adapted and comprises means for modulating a wave front and/or a phase relationship of a beam or a plurality of beams of said received primary illumination light L1 to thereby generate said pre-processed primary illumination light L1' having a modulated wave front and in particular a modulated phase relationship as said secondary illumination light L2.

Additionally or alternatively, in said illumination optics 40' said light pre-processing optical element 30 and in particular said phase modulator 30 may comprise a light entrance section E for receiving said beam or said plurality of sub-beams of said received primary illumination light L1, a light pre-processing section P for pre-processing said beam or said plurality of sub-beams of said beam of said received primary illumination light L1 in order to thereby generate a respective beam or a respective plurality of parts or sub-beams of a beam of pre-processed primary illumination light L1 as a respective beam or as a respective plurality of parts or sub-beams of a beam of secondary illumination light L2, and a light output section O for providing said secondary illumination light L2, wherein said light pre-processing section P is adapted and comprises means for independently and/or uncorrelatedly modulating wave fronts, phases or phase relationships of said plurality of parts or sub-beams of said beam of said received primary illumination light L1 to thereby generate said respective parts or sub-beams of pre-processed primary illumination light L1' as said respective parts or sub-beams of said beam secondary illumination light L2 having independently and/or uncorrelatedly modulated wave fronts, phases and/or phase relationships with respect to each other.

Said light pre-processing section P may comprise or may be formed by one or a plurality of liquid crystal elements 34' as wave front modulating and/or phase modulating elements.

Said liquid crystal element 34' may be formed as a plate-like structure and/or as a planar structure, in particular as a liquid crystal layer 34.

The arrangement formed by said light entrance section E, said light pre-processing section P and said light output section O may defines and form an optical axis Z, wherein said liquid crystal element 34' may define and form a normal axis and wherein said optical axis Z and said normal axis may be oriented parallely with respect to each other.

Said liquid crystal element 34' may be supported and/or framed by and between a first substrate 31*a*, in particular forming at least part of said light entrance section E and a second substrate 31*b*, in particular forming at least a part of said light output section O, in particular in a parallel manner.

Said first and/or said second substrate 31*a*, 31*b* may be formed as plate-like structures.

Said light pre-processing section P may comprise an electrode arrangement 35 of at least a pair of first and second control electrodes 32, 33 for exerting an electric field or voltage across said liquid crystal element 34' in order to set the liquid crystal element's optical properties in a controllable manner.

Said first control electrode 32 of said pair of said first and second control electrodes 32, 33 may be formed as a single and common electrode 32.

Said second control electrode 33 of said pair of said first and second control electrodes 32, 33 may be formed as an arrangement or as an array of independently controllable single electrodes 33*i* with i=1, . . . , M.

Said arrangement or said array of said independently controllable single electrode segments 33*i*; i=1, . . . , M of said second electrode 33 may define an according arrangement or an according array of liquid crystal element segments 34*i*; i=1, . . . , M of said liquid crystal element 34' or of said liquid crystal layer 34.

Said illumination optics 40' may comprise optical elements which are adapted and which are formed by or comprise means 40, 41 45 for receiving said secondary illumination light L2 from said light pre-processing optical element 30 and for generating and providing condensed secondary illumination light L2' as tertiary illumination light or output light L3.

The phase modulator 30 may be placed at any of the shown positions X1, X2, X2', X3 before, between, and after the optical elements 40, 41, 45.

Said illumination optics 40' may comprise a first lens array 40 of lens segments 40*j* with j=1, . . . , N which is arranged at the light output section's side of said light pre-processing optical element 30 and which is adapted and comprises means in order to receive said secondary illumination light L2 and in order to generate and provide an according number of N sub-beams of said secondary illumination light L2 as said tertiary illumination light L3 or a pre-form thereof.

Said illumination optics 40' may comprise a condenser lens 45 which is arranged in order to receive said sub-beams of said secondary illumination light L2 and which is adapted in order to focus said sub-beams of said secondary illumination light L2 in order to generate and provide said tertiary illumination light L3.

Said illumination optics 40' may comprise a second lens array 41 of lens segments 41*j'* with j'=1, . . . , N' which is arranged at the light output section's side of said light pre-processing optical element 30 and between said first lens array 40 and said condenser lens 44.

Said lens segments 40*j* with j=1, . . . , N and 41*j'* with j'=1, . . . , N' of said first and said second lens arrays 40, 41, respectively, may be formed and arranged in a one-to-one correspondence to each other, and according to said correspondence of said lens segments 40*j*, 41*j'* of said first and said second lens arrays 40, 41, respectively, a sub-beam of said second illumination light L2 may be generated by a given lens segment 40*j* of said first lens array 40 and its profile are imaged to a respective corresponding lens segment 41*j'* of said second lens array 41.

An illumination unit 1 is provided which comprises a light source unit 10' for generating and providing primary illumination light L1 and illumination optics according to the present invention for receiving said primary illumination light L1 and for generating and providing pre-process primary illumination light L1' as secondary illumination light L2 having a modulated wave front when compared to said primary illumination light L1.

The liquid crystal element 34' of said light pre-processing optical element 30 may be adapted and arranged in order to be completely irradiated by said primary illumination light L1.

Said light source unit 10' may comprise at least one coherent light source 10.

Said coherent light source 10 may be a laser light source.

Said light source unit 10' may comprise beam expander optics 20 which is adapted and which comprises means in order to expand said primary illumination light L1 for a complete irradiation of said liquid crystal element 34' of said light pre-processing optical element 30.

According to a further aspect of the present invention an image generation unit 1' which comprises an illumination unit 1 according the present invention and an image modulator unit 100' which is adapted, arranged and which comprises means for receiving illumination light L3 and for generating and providing output light L4 which is representative for an image I.

The present invention inter alia describes an optical set-up, which is capable to transform a laser beam or an array of laser beams into a shape, which is adapted in order to uniformly illuminate the entire active area of an image modulator. At the same time it randomly disturbs the phase front of the beam in order to reduce the speckle contrast of the projected image.

A method is described for uniformly illuminating an image modulator and reducing the speckle caused by a coherent and collimated light source (laser), comprising: Beam expander and/or beam shaper or a combination of both to expand and/or shape a coherent light beam into a beam of larger cross-section and/or different shape. At least one lens array positioned in the light path of said expanded light beam, thereby producing a plurality of sub-beams, each of said sub-beams illuminating the image modulator. At least one liquid crystal cell or LC cell positioned in the light-path of said expanded beam and/or in the light-path of said sub-beams, which is adapted and/or arranged to change the director profile in the LC layer in a lateral and/or temporal manner, thereby disturbing the wave front of the sub-beams and thereby reducing the speckle contrast of the resulting beam when projected on a screen.

Instead or additionally, at least one moving or rotating diffuser could be used in which case the LC cell or liquid crystal cell would essentially not be necessary.

The coherent light beam can be an array or arrangement of coherent light beams which can be incoherent to each other and wherein said beam expander and/or beam shaper is adapted and/or arranged in order to expand and/or shape each of said coherent light beams of said array.

The beam expander and/or beam shaper may be adapted and/or arranged in order to form the beam into a shape which is congruent to said lens array.

The beam expander and/or beam shaper may be adapted and or arranged in order to illuminate said lens array with a uniform light distribution.

The beam expander and/or beam shaper may comprise at least one diffractive optical element in order to expand and/or shape the beam.

The beam expander and/or beam shaper may comprise at least one diffusing optical element in order to expand and/or shape the beam.

The DOE or diffusing optical element may be rotating or moving in order to reduce speckle contrast.

The beam expander and/or beam shaper may comprise at least one refractive optical element in order to expand and/or shape the beam.

The lens array may consist of a plurality of lens segments, each lens segment of similar shape like the imager panel (e.g. rectangular) and wherein the optical power of each lens segment is adapted that each of said sub-beams is illuminating the entire image modulator.

A second lens array may be used wherein each lens segment is adapted and/or arranged in order to image the corresponding segments of said first lens array as object onto the image plane of the image modulator.

Additional optical means, e.g. condenser lens may be used between the lens array(s) and the image modulator in order to superimpose each of said sub-beams to the image modulator.

Optical means, e.g. field lens may be used between the lens array(s) and the image modulator in order to form a telecentric light beam on the image modulator.

A narrow angle diffuser may be used in front of said first lens array in order to suppress interference artifacts, wherein the angular diffusion is adapted in a way that the sub-beams emerging from each lens segment on the first lens array entirely fill, but do not exceed, the aperture of the corresponding lens segment on the second lens array.

The narrow angle diffuser plate may be periodically and/or randomly moved in order to further reduce speckle contrast. The movement can be translational in any direction or rotational or any combination thereof.

The present invention inter alia describes an illumination unit of or for a projector and takes advantage of laser light sources, but overcomes the commonly known disadvantages of laser light, which are speckle contrast and safety risks to the eye. A method is disclosed which reduces speckle contrast without any use of moving parts and which on the same time achieves a homogeneous light distribution on the image modulator.

In the following reference is taken in more detail to the accompanying Figures, which demonstrate details of preferred embodiments and of best modes for carrying out the present invention.

FIG. 9 demonstrates by means of a schematical block diagram some basic aspects of the present invention.

In FIG. 9 an embodiment of the image generating unit 1' according to the present invention is shown in a schematical way. The image generating unit 1' is formed by an embodiment of the illumination unit 1 according to the present invention which is adapted and which comprises means for generating illumination light, here in the form of tertiary illumination light L3. Said illumination light is received by an image modulator 100' which in turn forms image light or projection light L4 which is representative for an image I to be displayed. The embodiment for the illumination unit 1 comprises a light source unit 10' having at least one light source 10 for generating primary illumination light L1. Said primary illumination light L1 is emitted and irradiated to an embodiment of the light pre-processing optical element 30 or phase modulator 30 according to the present invention which is adapted and which comprises means in order to generate from said received primary illumination light L1 secondary illumination light L2 which is a pre-processed form L1' of said primary illumination light L1. The pre-processing includes a wave front modulation of said primary illumination light L1 and of one beam or a plurality of beams thereof in order to reduce or avoid parasitic optical noise due to the coherence of said primary illumination light L1. The embodiment for the light pre-processing optical element 30 or phase modulator 30 according to the present invention comprises a light entrance section E which is adapted for receiving said primary illumination light L1 from said light source unit 10'. Said primary illumination light L1 is then provided to a pre-processing section P which in turn performs the wave front modulation of said primary illumination light L1 in order to generate pre-processed primary illumination light L1' which is then provided as secondary illumination light L2 to a light output section O of said light pre-processing optical element 30 or phase modulator 30. Said light output section O is adapted comprises means for emitting and irradiating said secondary illumination light and for providing the same to illumination optics 40'. In said illumination optics 40' said received secondary illumination light L2 is made more uniform and then projected and focused for further processing, for instance for providing said secondary illumination light L2 as condensed secondary illumination light L2' to said image modulator unit 100'. Said condensed secondary illumination light L2' is also referred to as tertiary illumination light L3.

FIG. 10A is a schematical and cross-sectional side view of a preferred embodiment of the image generating unit 1' according to the present invention.

In this embodiment the illumination unit 10' comprises a light source 10 which is formed by a laser source or an array of laser sources and which therefore produces a laser beam or an array of laser beams as said primary illumination light L1. The laser light is received by an expander optics 20 in order to expand the primary illumination light L1 in order to achieve a complete irradiation or illumination of the following light pre-processing optical element 30 or phase modulator 30. The light pre-processing optical element 30 or phase modulator 30 in the case of the embodiment of FIG. 10A acts as an location dependent and time-dependent phase modulator which modulates the optical phases $\phi$ of the laser beams or of the different cross-sectional parts of the laser beams as a function of the spatial coordinates x, y and as a function of time t. The following illumination optics 40' comprises a lens array 40 which divides by means of respective lens segments the expanded and phase modulated laser beams or laser beam into N different sub-beams by means of said respective N lens segments. By means of a following condenser lens 45 as a part of said illumination optics 40' the spatially separated sub-beams are then focused onto a following image modulator unit 100' which comprises a respective image modulator 100.

All optical components of the embodiment shown in FIG. 10A are arranged along a common optical axis Z. Said optical axis Z is arranged perpendicularly or essentially perpendicularly with respect to the optical surfaces of said light pre-processing optical element 30 or phase modulator 30, said lens array 40 and said condenser lens 45.

A laser beam or an array of laser beams 10 is expanded by a beam expander optics 20. The expanded beam is divided by means of a lens array 40 into N spatially separated sub-beams. The sub-beams are focused by a condenser lens 45 to the image modulator 100. A phase modulator 30 is placed at a position within the expanded beam in order to disturb the phase of the transmitted light beam in an uncorrelated or random way in order to reduce the speckle contrast of the projected image. The lens array 40 comprises N different lens segments, wherein each of the lens segments has a rectangular shape with the same aspect ratio like the image modulator 100 in order to illuminate the entire active area of the image modulator 100. The resulting illumination distribution on the active area of the image modulator 100 is smoothed out by the superposition of the N sub-beams.

The embodiment of FIG. 10B is comparable to that of FIG. 10A except in that explicit beam expander optics 20 are missing the functionality of which is simultaneously realized by said light pre-processing optical element 30 or said phase modulator 30.

FIG. 11A is a schematical and cross-sectional side view of a preferred embodiment of the image generating unit 1' according to the present invention.

In this embodiment the illumination unit 10' comprises a light source 10 which is formed by a laser source or an array of laser sources and which therefore produces a laser beam or an array of laser beams as said primary illumination light L1. The laser light is received by a expander optics 20 in order to expand the primary illumination light L1 in order to achieve a complete irradiation or illumination of the following light pre-processing optical element 30 or phase modulator 30. The light pre-processing optical element 30 or phase modulator 30 in the case of the embodiment of FIG. 11A acts as an location dependent and time-dependent phase modulator which modulates the optical phases φ of the laser beams or of the different cross-sectional parts of the laser beams as a function of the spatial coordinates x, y and as a function of time t. The following illumination optics 40' comprises a lens array 40 which divides by means of respective lens segments the expanded and phase modulated laser beams or laser beam into N different sub-beams by means of said respective N lens segments. By means of a following condenser lens 45 as a part of said illumination optics 40' the spatially separated sub-beams are then focused onto a following image modulator unit 100' which comprises a respective image modulator 100.

All optical components of the embodiment shown in FIG. 11A are again arranged along a common optical axis Z. Said optical axis Z is arranged perpendicularly or essentially perpendicularly with respect to the optical surfaces of said light pre-processing optical element 30 or phase modulator 30, said lens array 40 and said condenser lens 45.

The embodiment shown in FIG. 11A is similar to the embodiment shown in FIG. 10A. However, some additional means are provided.

First of all said illumination optics 40' additionally comprises a second lens array 41 which is positioned between said first lens array 40 and said condenser lens 45. The first lens array 40 comprises lens segments 40$i$ with i=1, . . . , N. In the embodiment shown in FIG. 3A the second lens array 41 also comprises N lens arrays 41$i$ with i=1, . . . , N. In the particular case of FIG. 3A the lens segments 40$i$ of the first lens array 40 and the lens segments 41$i$ of the second lens array 41 are geometrically arranged in order to achieve a one-to-one correspondence with respect to each other. That means that a sub-beam generated by a lens segment 40$i$ of the first lens array 40 is imaged and focused onto a distinct and fixed lens segment 41$i$ of the second lens array 41.

Additionally, the image modulator 100' further comprises a field lens 90 in front of the image modulator 100 in order to generate from the produced N sub-beams with respective sub-profiles a common tele-centric beam for the image modulator 100.

In this further preferred embodiment a second lens array 41 is used to improve the illumination distribution on the image modulator 100. In that case both lens arrays are arranged and/or adapted in a way that the lens arrays are close to the focal plane of each other as described in FIG. 3A. In this case the beam profile at the position of the lens array 40 is divided by the (rectangular) shape of the lens segments 40$i$, i=1, . . . N into multiple sub-profiles. Each sub-profile is imaged by the corresponding lens segment 41$i$, i=1, . . . N and the condenser lens 45 to the image modulator 100, thereby superposing the N sub-profiles in order to achieve a homogeneous profile at the position of the image modulator 100.

It is further preferred to use a so-called field lens 90 in front of the image modulator in order to obtain a telecentric beam, which is required by most image modulators 100.

The étendue of the light beam at the position of the image modulator 100 is defined by the size of the lens array 41 with half diameter, a' and the distance, L' of the condenser lens 45 to the image modulator 100. The étendue equals E=π×A×sin 2(θ), where A is the area of the image modulator 100 and θ=arc tan(a/L) is the divergence angle of the light beam at the position of the image modulator 100. It must be mentioned that even if lasers have almost zero étendue—which is a clear benefit from optical design point of view—the étendue is increased to a certain value by the means of the present invention. This increase of étendue is necessary to reduce the spatial coherence of the beam and consequently to reduce the speckle contrast. An important side effect of this increase of étendue is a higher safety for the eye: The light coming out of the image modulator is neither coherent nor can it be collimated again like a laser beam. On the other hand the étendue can be controlled by the size and distance of the optical parts to a fairly low value, which still gives a benefit to other light sources like arc lamps or LED.

The embodiment of FIG. 11B is comparable to that of FIG. 11A except in that explicit beam expander optics 20 are missing the functionality of which is simultaneously realized by said light pre-processing optical element 30 or said phase modulator 30.

FIG. 12 is a schematical and cross-sectional side view of a preferred embodiment of the image generating unit 1' according to the present invention.

In this embodiment the illumination unit 10' comprises a light source 10 which is formed by an array of laser sources 10 and which therefore produces a laser beam or an array of laser beams as said primary illumination light L1. The laser light is received by a expander optics 20 in order to expand the primary illumination light L1 in order to achieve a complete irradiation or illumination of the following light pre-processing optical element 30 or phase modulator 30. The light pre-processing optical element 30 or phase modulator 30 in the case of the embodiment of FIG. 12 again acts as an location dependent and time-dependent phase modulator which modulates the optical phases φ of the laser beams or of the different cross-sectional parts of the laser beams as a function of the spatial coordinates x, y and as a function of time t. The following illumination optics 40' comprises a lens array 40 which divides by means of respective lens segments the expanded and phase modulated laser beams or laser beam into N different sub-beams by means of said respective N lens segments. By means of a following condenser lens 45 as a part of said illumination optics 40' the spatially separated sub-beams are then focused onto a following image modulator unit 100' which comprises a respective image modulator 100.

All optical components of the embodiment shown in FIG. 12 are arranged along a common optical axis Z. Said optical axis Z is arranged perpendicularly or essentially perpendicularly with respect to the optical surfaces of said light pre-processing optical element 30 or phase modulator 30, said lens array 40 and said condenser lens 45.

Here again said illumination optics 40' comprises first and second lens arrays 40 and 41, respectively, with respective lens segments 40$i$, 41$i$. Additionally, the image modulator unit 100' again comprises a field lens 90.

In the embodiment of FIG. 12 the light source unit 10' comprises a plurality of laser light sources 10 in order to achieve an increased illumination of the light pre-processing optical element 30 or phase modulator 30 and further of the image modulator unit 100'.

Figure 13:
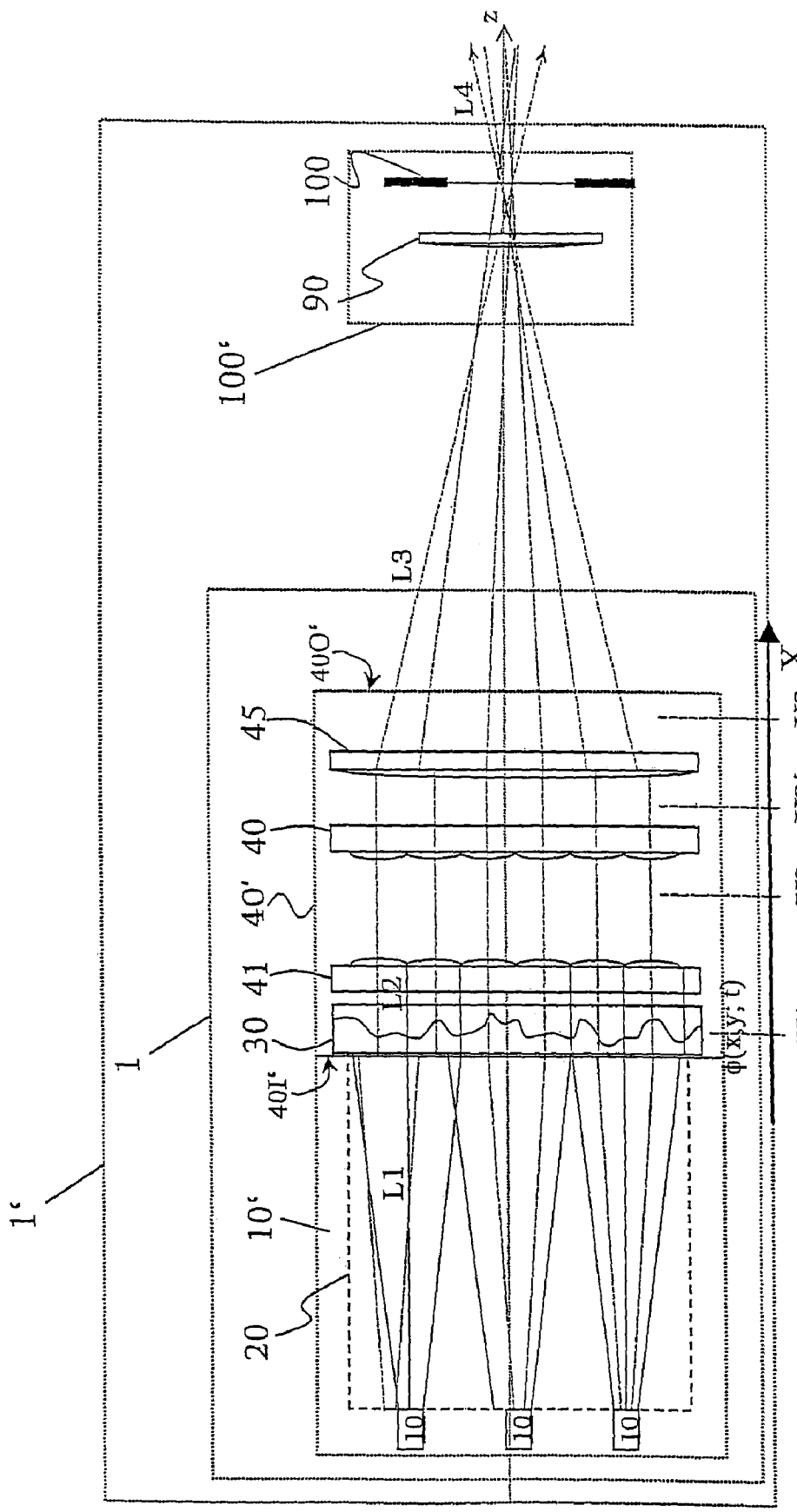
FIG. 13 is a schematic and cross-sectional side view for illustrating an image generating unit according to a another embodiment of the present invention.

The same holds for the embodiment of FIG. 13.

The possible use of a plurality of "n" single lasers, which are incoherent with respect to each other, has the advantage of further reducing the speckle contrast by $\sqrt[2]{n}$.

It might be necessary to use as light source an array (1D or 2D) of lasers in order to achieve a sufficiently high optical output power. In that case the beam expander 20 must be adapted according to FIG. 12 or 13.

In case of FIG. 12 the beam expander is arranged and/or adapted in a way that each laser beam is expanded to illuminate the entire lens array.

In case of FIG. 13 the beam expander is arranged and/or adapted in a way that each laser beam illuminates only a part of the lens array 40.

In FIGS. 9, 10A, 10B, 11A, 11B, 12, and 13 the arrow X along the direction Z of the optical axis indicates possible positions X1, X2, X2', X3 at which the light pre-processing optical element 30 or said phase modulator 30 may be situated.

In each case of the embodiments light input and light output portions 40I' and 40O' of the illumination optics 40' are indicated in the FIGS. 9, 10A, 10B, 11A, 11B, 12, and 13.

REFERENCE SYMBOLS 1 illumination unit according to the present invention
1' image generating unit according to the present invention
10 light source, coherent light source, laser light source
10' light source unit
20 expander optics
21 negative lens
22 diffuser
23 diffractive optical element
24 rotating mirror
25 positive lens
30 light pre-processing optical element according to the present invention, phase modulator according to the present invention
31a first substrate, first substrate plate
31b second substrate, second substrate plate
32 first control electrode
33 second control electrode
33i electrode segment of second control electrode
34 liquid crystal layer
34' liquid crystal element
35 electrode arrangement
40 first lens array
40' illumination optics
40I' light input portion
40O' Light output portion
40i lens segment of first lens array 40
41 second lens array
41i lens segment of second lens array 41
45 condenser lens
90 field lens
100' image modulator
100" projection screen
d layer thickness of liquid crystal layer 34
E light entrance section
I image
L1 primary illumination light
L1' pre-processed primary illumination light, phase modulated primary illumination light
L2 secondary illumination light
L2' condensed secondary illumination light
L3 tertiary illumination light
L4 projection light, image light, output light
LC liquid crystal
$n_{eff}$ refraction index of liquid crystal layer 34
O light output section
P light pre-processing section
t time
Ui voltage applied to segment electrode 33i of second control electrode 33
Z optical axis, direction of optical axis
λ wavelength of light
φ phase modulation/retardation caused by liquid crystal layer 34
$S_1, \ldots, S_N$ Coherent Sub-beams
α Angle between sub-beams

The invention claimed is:

1. An image generation unit for projecting an image at a projection screen comprising:
    an illumination unit configured to generate a plurality of coherent sub-beams and to illuminate an image modulator, the illumination unit including a light source;
    a projection lens configured to superimpose each of the coherent sub-beams onto the projection screen plane, an optical set-up configured to introduce angles between each two of the sub-beams, which are chosen to produce uncorrelated speckle patterns in the projection screen plane, resulting in an interference speckle pattern; and
    a phase modulator including a liquid crystal cell configured to change its directory profile in a lateral manner, thereby able to change the phase of light of each sub-beam individually and to change its directory profile in a temporal manner individually for each sub-beam such that a resulting interference speckle pattern in the image plane changes and is uncorrelated from previous interference speckle patterns and the change is so fast, that during an integration time of a detector, speckle contrast of a resulting time-averaged interference speckle pattern is reduced compared with a not time-averaged interference speckle pattern.

2. An image generation unit according to claim 1, wherein the angles are chosen to be at least half of an aperture angle of a detector to detect the image at the projection screen.

3. An image generation unit according to claim 1, wherein the liquid crystal cell contains a nematic liquid crystal.

4. An image generation unit according to claim 1, wherein the liquid crystal cell contains a polymer dispersed liquid crystal.

5. An image generation unit according to claim 1, wherein the light source includes a laser and a beam expander to build an expanded beam, represented by the sub-beams, and
    the optical set-up comprises a first and a second integrator plate and a condenser, whereby the integrator plates include a plurality of lens segments having a rectangular shape, whereby each such lens segment of the first integrator plate is imaged by a corresponding lens segment of the second integrator plate and a condensor lens onto the image plane.

6. An image generation unit according to claim 5, wherein the beam expander includes a combination of concave and convex lenses.

7. An image generation unit according to claim 5, wherein the beam expander includes a combination of a diffuser and a convex lens.

8. An image generation unit according to claim 5, wherein the beam expander includes a combination of a moving mirror and a convex lens.

9. Am image generation unit according to claim 1, wherein the phase modulator is situated in or close to an aperture stop of the projection lens.

10. A method to use the image generation unit according to claim 1, wherein each of the superimposed sub-beams produces a speckle pattern in the image plane and so a resulting interference speckle pattern in the image plane is built, and the phase modulator changes its directory profile in the temporal manner individually for each sub-beam such that the resulting interference speckle pattern in the image plane changes and is uncorrelated from the previous interference speckle patterns and the change is so fast, that during an integration time of a detector, the speckle contrast of the resulting time-averaged interference speckle pattern is reduced compared with the not time-averaged interference speckle pattern.

* * * * *